United States Patent [19]

Beck et al.

[11] Patent Number: 5,127,787
[45] Date of Patent: Jul. 7, 1992

[54] LIFT AND CARRY MECHANISM AND METHOD

[75] Inventors: Wilbert D. Beck, Utica; Mark D. Stapels, New Baltimore; David L. Stapels, Utica; Gregory A. Stapels, Clinton Township, Macomb County; Michael G. Yocum, Lake Orion; James D. Scannell, Grosse Pointe Farms, all of Mich.

[73] Assignee: Brothers Industries, Inc., Madison Heights, Mich.

[21] Appl. No.: 528,226

[22] Filed: May 24, 1990

[51] Int. Cl.$^5$ .............................. B65G 37/00
[52] U.S. Cl. .................. 414/222; 414/786; 198/468.2
[58] Field of Search ............... 414/222, 225, 226, 749, 414/750, 751, 752, 753, 786; 198/468.2, 621, 774.1

[56] References Cited

U.S. PATENT DOCUMENTS

| | | |
|---|---|---|
| Re. 32,804 | 12/1988 | Mason . |
| 4,154,350 | 5/1979 | Frohn ..................... 414/753 X |
| 4,217,978 | 8/1980 | Stalker . |
| 4,254,860 | 3/1981 | Koontz . |
| 4,343,590 | 8/1982 | D'Aloisio ................. 414/226 X |
| 4,377,986 | 3/1983 | Juve ...................... 414/222 X |
| 4,516,504 | 5/1985 | Brems et al. . |
| 4,537,087 | 8/1985 | Faitel . |
| 4,556,141 | 12/1985 | Faitel . |
| 4,573,862 | 3/1986 | Anderson . |
| 4,629,384 | 12/1986 | Beshke et al. . |
| 4,669,607 | 6/1987 | Mason . |
| 4,729,588 | 3/1988 | Kratzer . |
| 4,750,605 | 6/1988 | Brems et al. . |
| 4,832,563 | 5/1989 | Massmann . |
| 4,865,180 | 9/1989 | Brems et al. . |
| 4,921,387 | 5/1990 | Bennington ............. 414/751 X |
| 4,932,235 | 6/1990 | Rieger et al. ........... 198/621 X |
| 4,995,505 | 2/1991 | Takahashi et al. ....... 414/752 X |

Primary Examiner—Robert J. Spar
Assistant Examiner—Donald W. Underwood
Attorney, Agent, or Firm—Harness, Dickey & Pierce

[57] ABSTRACT

A "lift and carry" transfer apparatus is provided for transferring or "indexing" a workpiece between successive work stations in a multi-operation process. The transfer apparatus includes a modular support structure from which a generally elongated shuttle assembly is horizontally supported. A first drive mechanism is provided for generating a predetermined amount of reciprocable rectilinear vertical movement of the shuttle assembly through a predetermined range of motion. The transfer apparatus further includes structure for selectively indexing the workpiece along a horizontal plane relative to the shuttle assembly. In particular, a second drive mechanism is provided for generating rectilinear horizontal motion of the workpiece. A programmable controller is provided for selectively controlling the actuation of the first and second drive mechanisms.

27 Claims, 4 Drawing Sheets

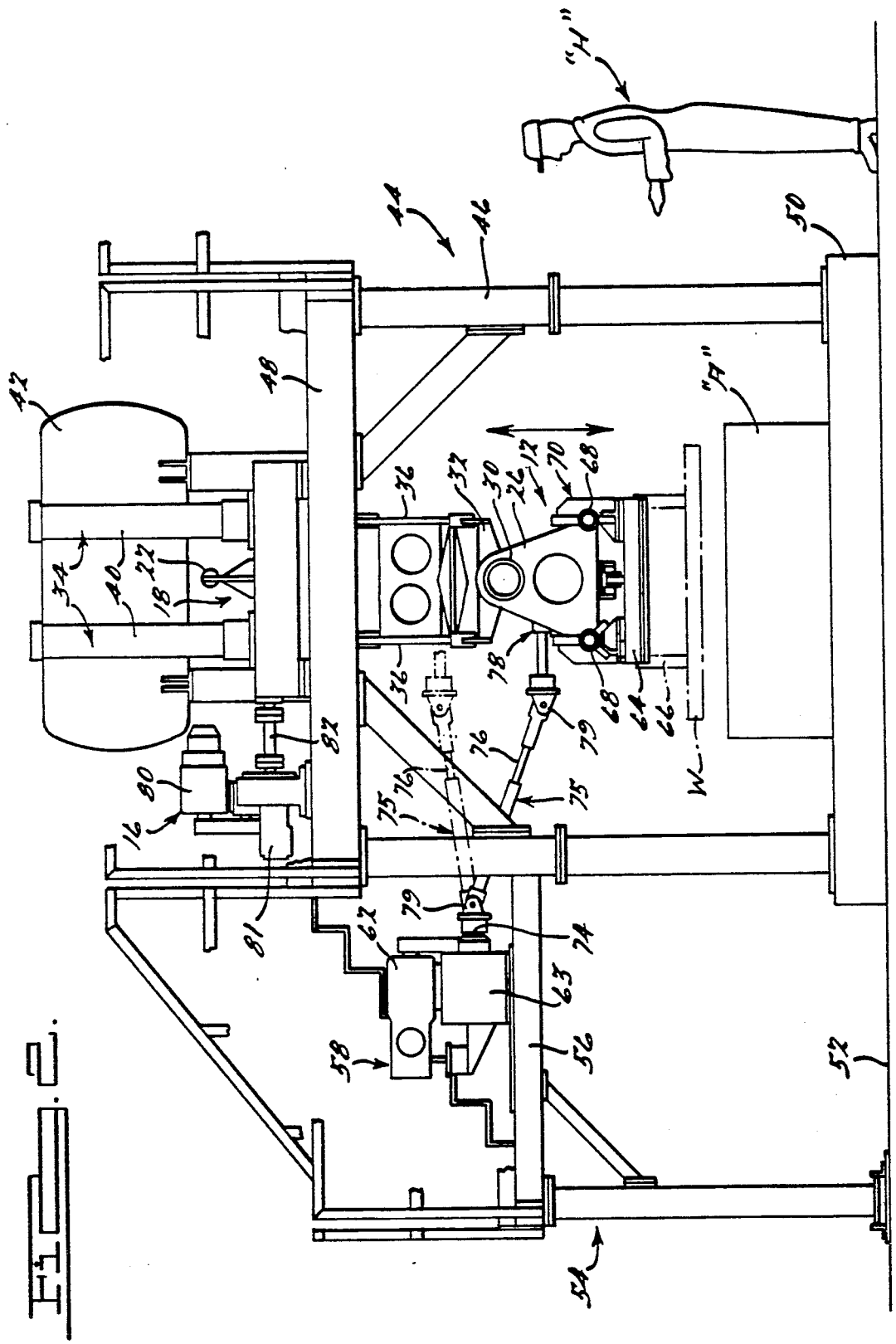

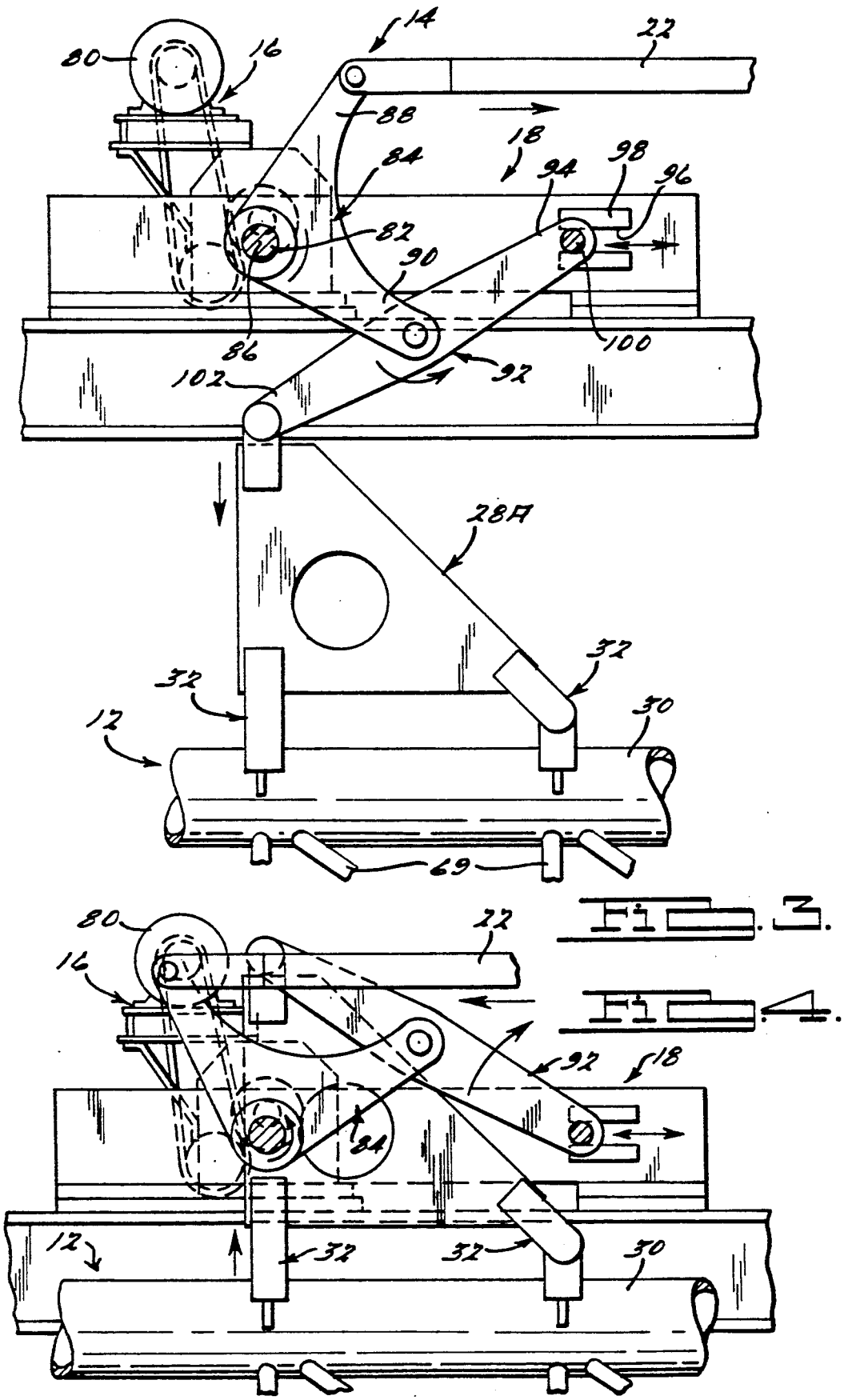

LIFT AND CARRY MECHANISM AND METHOD

BACKGROUND AND SUMMARY OF THE INVENTION

The present invention relates generally to an apparatus and method for transferring a workpiece and, in particular, to a modular lift and carry apparatus adapted for transferring large parts between successive work stations.

Automated transfer devices are used for moving a workpiece between different stations in a repetitive manufacturing process. Currently, most industrial transfers are either robotic devices or shuttle systems. In general, robotic transfers are used to provide reciprocable linear and/or arcuate movement between the successive work stations and are generally best suited for handling relatively small and lightweight parts. Moreover, robotic devices are generally impractical for use in multi-station successive transfer operations due primarily to their inability to transfer a plurality of successive parts in a single transfer operation. Therefore, large, bulky or heavy workpieces and multi-station processes typically require application of shuttle-type transfer systems.

Conventional shuttle transfers are generally quite massive and require significant floor space. Furthermore, conventional shuttle systems have the disadvantage of being installed in such a manner that they cannot be easily removed for repairs, access to the work stations for tooling changeover purposes and the like. In addition, shuttle systems have typically been designed for a specific transfer application and, as such, are generally not adapted for relocation to a different transfer application within a production facility.

Accordingly, it is a primary object of the present invention to overcome the disadvantage of the prior art and provide a workpiece transfer apparatus adapted to generate rectilinear vertical and horizontal movement for transferring a workpiece between successive work stations.

It is another object of the present invention to provide a transfer apparatus that is adapted to accept bulky, heavy and otherwise awkward workpieces while providing highly accurate part placement capability. Furthermore, the present invention is modular in construction for simple installation around pre-existing equipment. The universality of the modular components facilitates improved serviceability and durability as well as simple modification for accommodating numerous part transfer applications.

Another object of the present invention is to provide a transfer apparatus and method capable of selectively controlling the part placement characteristics through a relatively large and continuously variable range of rectilinear vertical and horizontal motion.

It is a further object of the present invention to provide an improved transfer apparatus capable of producing improved transfer speed and weight handling characteristics.

In accordance with the teachings of the preferred embodiment of the present invention, a "lift and carry" transfer apparatus is provided for transferring or "indexing" a workpiece between successive work stations in a multi-operation process. The transfer apparatus includes a modular support structure from which a generally elongated shuttle assembly is horizontally supported. A first drive mechanism is provided for generating a predetermined amount of reciprocable rectilinear vertical movement of the shuttle assembly through a predetermined range of motion. The transfer apparatus further includes means for selectively indexing the workpiece along a horizontal plane relative to the shuttle assembly. In particular, a second drive mechanism is provided for generating rectilinear horizontal motion of the workpiece. Programmable controller means is provided for selectively controlling the actuation of the first and second drive mechanisms.

Additional objects, advantages, and features of the present invention will become apparent from a reading of the following detailed description and the appended claims, taken in conjunction with the accompanying drawings.

BRIEF DESCRIPTION OF THE DRAWINGS

FIG. 2 is an end view of FIG. 1;

FIGS. 3 and 4 are partial section views illustrating the operation of the transfer lift mechanism of the present invention;

DETAILED DESCRIPTION OF THE PREFERRED EMBODIMENT

Figure 1:
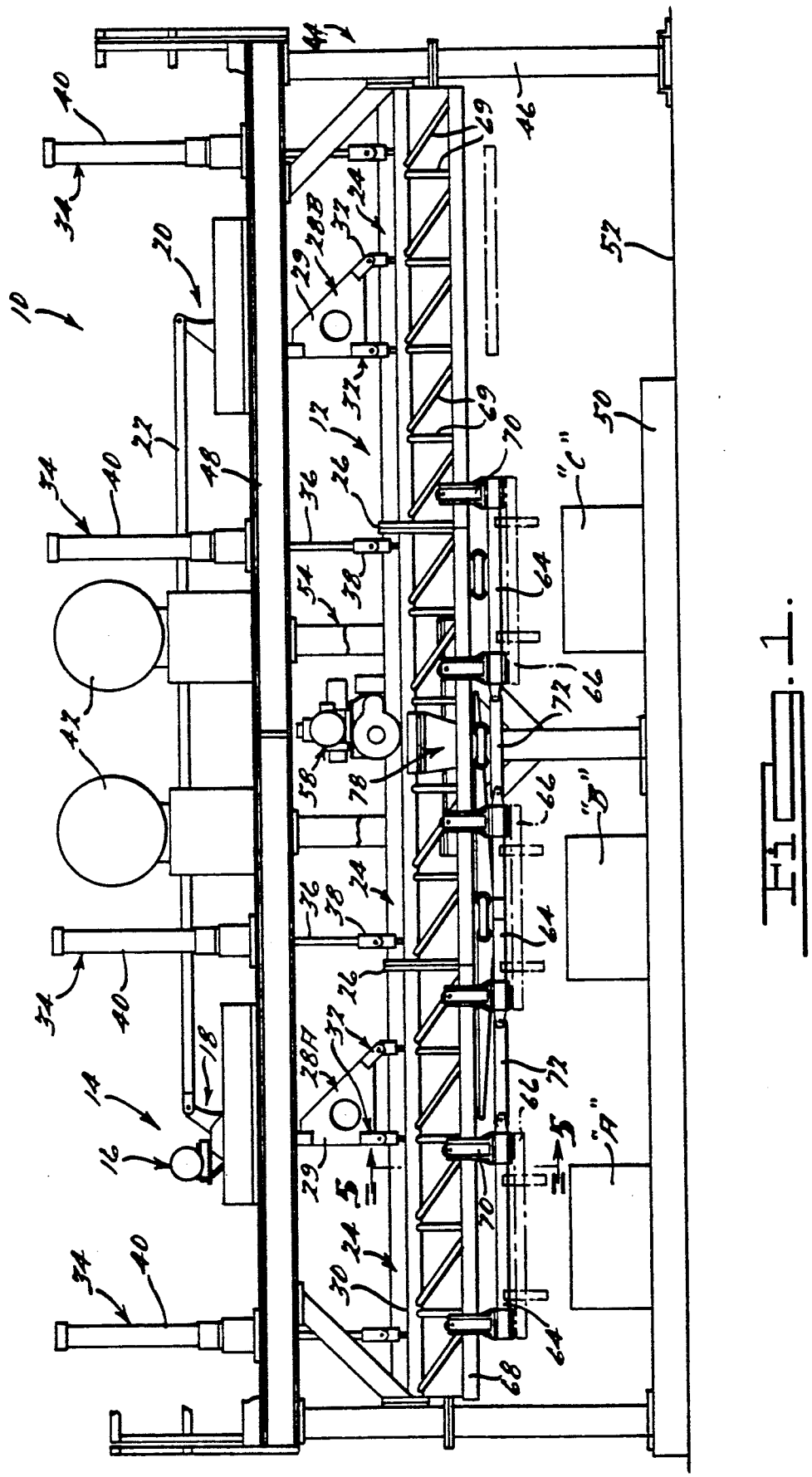
FIG. 1 is a front plan view of a transfer apparatus made in accordance with the teachings of the preferred embodiment of the present invention.

Referring to FIGS. 1 and 2 of the drawings, "lift and carry" transfer apparatus 10 is illustrated in accordance with a preferred embodiment of the present invention. However, it is to be understood that many of the details, including the structure to be hereinafter described, are merely exemplary in nature and are not to be interpreted to limit the fair scope and meaning of the present invention.

Provision is made for generating vertical rectilinear movement of an elongated shuttle assembly 12 under control of a suitable programmable controller (not shown). Elongated shuttle assembly 12 is oriented in a generally horizontal plane relative to a floor surface. The vertical rectilinear movement of shuttle assembly 12 is preferably provided by way of a first drive mechanism 14, (hereinafter referred to as the "transfer lift mechanism"). In this embodiment, transfer lift mechanism 14 includes an electro-mechanical drive 16 capable of providing at least about 48 inches of vertical lift of shuttle assembly 12 at an average speed of approximately 1½ feet per second. Electro-mechanical drive 16 would include means for generating a desired speed reduction to produce the desired speed of vertical lift. However, it is contemplated that any suitable drive mechanism could be readily substituted for electro-mechanical drive 16. Transfer lift mechanism 14 is coupled to a primary "scotch-yoke" type mechanical linkage assembly 18. Primary linkage assembly 18 is, in turn, coupled to shuttle assembly 12. A secondary "scotch-yoke" mechanical linkage assembly 20 is located in spaced relation to primary linkage 18 and is similarly coupled to shuttle assembly 12. Secondary linkage assembly 20 is interconnected so as to be driven by primary linkage assembly 18 via a push-pull bar 22. Preferably, secondary linkage assembly 20 is a "slave" device which is substantially identical to, and synchronously driven by, primary linkage assembly 18. Selective actuation of lift mechanism 14 changes generally pivotal movement of linkage assemblies 18 and 20 into translational movement to produce a desired amount of vertical rectilinear displacement of shuttle assembly 12. In particular, the programmable controller selectively controls actuation of electro-mechanical drive 16 of transfer lift mechanism 14 such that synchronous movement of linkage assemblies 18 and 20 generates the desired amount of vertical movement of shuttle assembly 12.

Shuttle assembly 12 includes a plurality of axially aligned tri-support beam modules 24 which are interconnected to define an elongated beam assembly. The tri-support beam modules 24 are an improvement over conventional single beam shuttle systems by providing improved strength to weight ratio, reduced flexure and superior rigidity and stability. FIG. 1 illustrates the utilization of three (3) tri-support beam modules 24 having their respective triangular end plates 26 secured together in mating relation. While three modules 24 are shown, it is contemplated that the universality and modular construction of the present invention will permit application of any number of modules required for the particular transfer operation.

Stabilizing links 28A and 28B interconnect main beam 30 of modules 24 with linkage assemblies 18 and 20, respectively. Preferably, means such as hanger mounts 32 are provided to secure stabilizing links 28A and 28B to main beam 30. More preferably, stabilizing links 28A and 28B each include a pair of laterally offset triangular link members 29 secured as by two hanger mounts 32 to opposite lateral sides of main beam 30 for distributing the loading. To provide means for counter-balancing shuttle assembly 12, apparatus 10 includes a plurality of counter-balance devices. Preferably, the counter-balance devices are pneumatic dampers 34 having the ends of their telescopically movable rods 36 secured as by hanger mounts 38 to main beam 30. The cylindrical housing 40 of dampers 34 are fixedly secured to an overhead support structure to be described in greater detail hereinafter. More preferably, a plurality of laterally offset pairs of pneumatic dampers 34 are generally equally spaced along the length of shuttle assembly 12 so as to provide generally distributed counter-balance loading for maintaining shuttle assembly 12 in the desired horizontal plane. A pressurized fluid source (not shown) is in communication with counter-balance dampers 34 to generate the required counter-balancing forces. Preferably, air surge tanks 42 and a pump (not shown) are utilized to maintain the desired counter-balance force for dampers 34.

A key feature of apparatus 10 includes the universality of components and its modular construction. Specifically, superstructure 44 includes a plurality of laterally spaced vertical columns 46 which support an overhead balcony 48 on which many of the overhead components are mounted. Preferably, superstructure 44 is prefabricated in modular sections which may be simply and quickly installed around existing work stations to minimize interference with the operation of equipment. As is illustrated in reference to FIG. 2, columns 46 are laterally offset by a predetermined distance to permit ready access therebetween. Columns 46 may be secured to a base structure 50 or to a common floor surface 52 as is required. A substructure 54 is provided which is secured to superstructure 44 and has a lowered balcony portion 56 which is adapted to support a transfer index mechanism 58. A human operator "H" is shown to illustrate the relative size and orientation of the various components. As is apparent, apparatus 10 is adapted to transfer relatively large and/or bulky workpieces. Preferably, apparatus 10 is capable of transferring parts which weight up to about 2000 pounds. A plurality of successive work stations "A", "B" and "C" are schematically illustrated as an exemplary representation of the several positions associated with a typical multi-operational process to which transfer apparatus 10 is applicable.

Preferably, transfer index mechanism 58 is an electro-mechanical drive 62. Again, however, any suitable drive mechanism is applicable to the present invention. As will be described hereinafter in greater detail, transfer index 58 is provided to generate horizontal rectilinear movement of a plurality of interconnected transfer carriages 64 and workpiece supporting means 66 (i.e. grippers, suction cups, etc.) connected thereto which are specifically adapted for engaging the workpiece "W". Mechanism 67 has speed control means for generating the desired speed of horizontal movement of the various components. Transfer carriages 64 are supported on a pair of lower transfer beams 68 associated with tri-support beam modules 24 such as by roller clusters 70 for horizontal rectilinear movement relative thereto. Lower transfer beams 68 are laterally offset below main beam 30 to create generally triangular beam modules 24. Braces 69 are employed to rigidly support the separate beams between end plates 26.

The specific number of transfer carriages 64 used in a particular application is dependent on the number of progressive work stations to which workpiece "W" will be successively transferred. In particular, a coupling bar 72 interconnects adjacent transfer carriages 64 and has length adjustment capability to accommodate for variable spacing requirements between adjacent work stations. The interconnected plurality of carriages 64 define a carriage assembly. Transfer drive device 62 includes a rotatable output shaft 74. A jack shaft 75 having a telescopically movable intermediate shaft 76 connects output shaft 74 to rack drive system 78 secured between lower beams 68 of shuttle assembly 12. Universal joints 79 are provided to accommodate vertical motion of shuttle assembly 12. Intermediate shaft 76 moves telescopically to compensate for arcuate motion of jack shaft 75 during vertical movement of shuttle assembly 12. In particular, FIG. 2 illustrates intermediate jack shaft 75 pivoted between a first vertically downward position of shuttle assembly 12 and a second vertically upward position (phantom lines). Preferably, jack shaft 75 and universal joints 79 are adapted to permit shuttle assembly 12 to travel within a desired range of vertical motion while transmitting power from output shaft 74 to rack drive 78.

Referring now in particular to FIGS. 2, 3 and 4, the components associated with transfer lift mechanism 14 and primary linkage assembly 18 are shown in greater detail. In particular, electro-mechanical drive 16 includes motor means 80 and speed reduction means 81 which are selectively actuated by the programmable controller to generate rotation of output shaft 82. Output shaft 82 is coupled to a first pivot member 84 of primary linkage assembly 18 such that rotation of output shaft 82 produces corresponding rotation of first pivot member 84 about first pivot point 86. First pivot member 84 is generally "C"-shaped having a first leg 88 and a second leg 90. First leg 88 is connected to one end of push-pull bar 22. Second leg 90 is pivotally coupled to a central portion of an elongated arm member 92. Arm member 92 has a first end 94 slidingly constrained within a slot 96 of yoke 98 for pivotal motion about second pivot pin 100. Second end 102 of arm member 92 is coupled to an upper portion of stabilizing link 28A.

Rotation of output shaft 82 rotates the various linkage components so as to change the generally pivotal motion of primary linkage 18 into rectilinear vertical movement of shuttle assembly 12. In particular, the directional arrows illustrated in FIG. 3 reflect the functional operation of the herebefore described linkage components of primary linkage assembly 18 for generating downward rectilinear movement of shuttle assembly 12. Similarly, the directional arrows shown in FIG. 4 illustrate the operative interaction of primary linkage assembly 18 for moving shuttle assembly 12 in an upward direction. As is apparent, the direction and amount of rotation of output shaft 82 is directly proportional to the direction and amount of vertical rectilinear movement of shuttle assembly 12. Preferably, "slave" secondary linkage assembly 20 is identical in configuration to primary linkage assembly 18 with similar connection to the opposite end of push-pull bar 22 and stabilizing link 28B. In this manner, continuously variable vertical movement of shuttle assembly 12 through a predetermined range of motion is provided.

Figure 5:
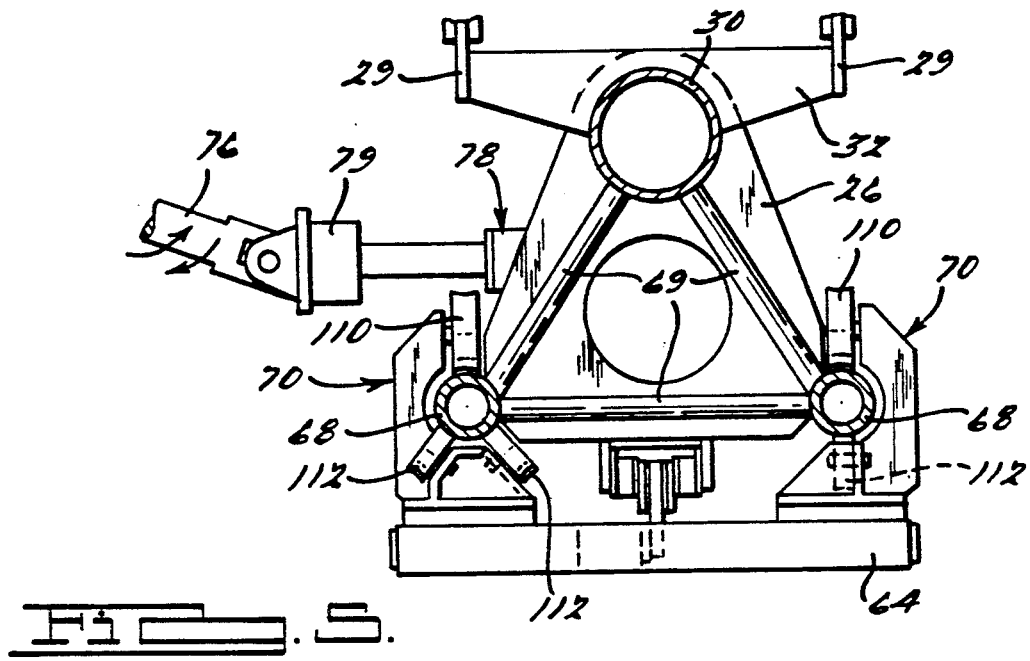
FIG. 5 is a cross-sectional view of the shuttle assembly taken along line 5—5 of FIG. 1.
Figure 6:
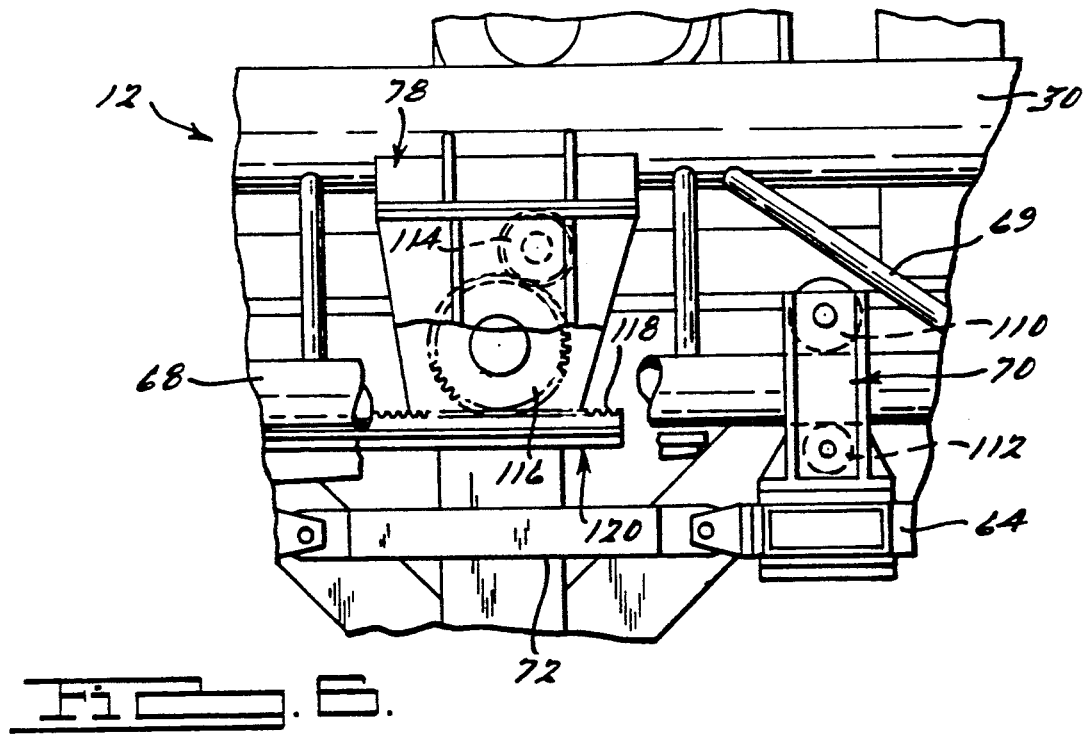
FIG. 6 is an enlarged view, partially broken away, of FIG. 1, showing a rack and pinion drive mechanism of the present invention.

Referring now to FIGS. 5 and 6, the structure and operation of the components associated with generating horizontal rectilinear movement of the carriage assembly along lower beams 68 of shuttle assembly 12 is illustrated. In particular, each transfer carriage 64 is supported at opposite end by a pair of laterally spaced roller cluster assemblies 70. In particular, the roller cluster assemblies 70 support carriages 64 from lower beams 68. Roller cluster assemblies 70 include an upper roller member 110 and at least one lower roller member 112 which rollingly engage lower beams 68. As is shown in FIG. 5, roller clusters 70 may include two or three equally spaced roller members.

In operation, actuation of the transfer drive device 62 and its associated speed reduction means 63 act to drive output shaft 74 and, in turn, intermediate shaft 76. Jack shaft 75 is coupled at opposite ends to universal joints 79 to permit vertical movement of shuttle assembly 12 during horizontal movement of the carriage assembly. A first gear 114 of rack drive 78 is coupled to intermediate shaft 76 so as to be driven thereby. Thereafter, first gear 114 drives a pinion gear 116 supported within rack drive mechanism 78. Pinion gear 116 is intermeshed with teeth 118 of an elongated rack 120 secured to the carriage assembly. More specifically, one end of jack shaft 75 is coupled to a first universal joint 79 and the opposite end of intermediate shaft 76 is coupled to a second universal joint 79. The length of rack 120 defines the maximum length of horizontal motion which preferably is at least about 20 feet. Rack 112 is supported on the carriage assembly in a horizontal plane and in generally parallel fashion to lower beams 68. Rack 120 is supported between lower beams 68 to drivingly move transfer carriages 60. Therefore, rotation of pinion gear 116 in a first direction generates horizontal movement of rack 120 and, in turn, of the carriage assembly in a first direction. Likewise, rotation of pinion gear 116 in a second direction generates horizontal movement of the carriage assembly in the second direction. Furthermore, the amount of horizontal movement is directly dependant on the amount of rotation of pinion 116. Therefore, reciprocal horizontal motion between adjacent work stations can be selectively controlled by selective actuation of mechanism 58 by the programmable controller. Preferably, rack 120 is part of a rack assembly which is disposed for movement through opposite lateral portions of rack drive 78.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for transferring parts between successive work stations in a multi-station process, said apparatus comprising:

a shuttle assembly suspended in a horizontal orientation above the successive work stations;

first electro-mechanical drive means operable for moving said shuttle assembly along a generally rectilinear vertical path relative to the successive work stations, said first electro-mechanical drive means comprising an electro-mechanical device having a first output shaft, a primary linkage assembly coupled between said first output shaft and said shuttle assembly for changing rotational motion of said first output shaft into rectilinear vertical motion of said shuttle assembly, and a secondary linkage assembly spaced apart from said primary linkage assembly and interconnecting means coupled to said primary linkage assembly and said shuttle assembly such that said primary linkage assembly synchronously drives said secondary linkage assembly upon rotation of said first output shaft;

counter-balance means for supporting said shuttle assembly in said horizontal orientation;

a carriage assembly having a plurality of carriages supported on a lower portion of said shuttle assembly and adapted to be horizontally movable relative to said shuttle assembly, said carriage assembly having means for mechanically interconnecting said plurality of carriages in a predetermined spaced relation;

second electro-mechanical drive means operable for moving said carriage assembly relative to said shuttle assembly along a generally rectilinear horizontal path to transfer the parts between the successive work stations;

work supporting means supported on each of said plurality of carriages for picking up and depositing of the parts; and controller means for selectively controlling said first and second electro-mechanical drive means such that said rectilinear vertical path of said shuttle assembly and said rectilinear horizontal path of said carriage assembly are generally continuously variable through a predetermined range of motion.

2. The apparatus of claim 1 further comprising overhead structure means for supporting said shuttle assembly above the work stations, said overhead structure means further supporting said counter-balance means, and said first and second drive means above the work stations.

3. The apparatus of claim 3 wherein rotation of said first output shaft in a first direction drives said primary and secondary linkage assemblies to generate upward rectilinear vertical movement of said shuttle assembly, and rotation of said first output shaft in a second direction drives said primary and secondary linkage assemblies to generate downward rectilinear movement of said shuttle assembly.

4. The apparatus of claim 3 wherein said primary and secondary linkage assemblies are a scotch-yoke type linkage each comprising:

a first pivot member coupled for rotation about a first pivot and having first and second leg members, said first leg member of said primary and secondary linkage assemblies being interconnected by a horizontal push-pull bar;

a second pivot member secured to said second leg of said first pivot member and having first and second opposite ends, said first end slidably confined within a horizontally aligned yoke and said second end secured to said shuttle assembly;

said first pivot member of said primary linkage assembly coupled to said first output shaft about said first pivot.

5. The apparatus of claim 3 wherein said second electro-mechanical drive means comprises;

a second electro-mechanical device having a second output shaft operative to rotate in response to actuation of said second electro-mechanical device by said controller means;

a toothed rack member secured to said carriage assembly; and gear means intermeshed with said toothed rack member for driving said rack member along said horizontal rectilinear path, said gear means being driven by said second output shaft of said second electro-mechanical device and secured for rotation to said shuttle assembly.

6. The apparatus of claim 5 wherein said second electro-mechanical device is mounted on said overhead structure means such that a jack shaft interconnects said second output shaft of said second electro-mechanical device to said pinion means, said jack shaft having an intermediate shaft that is telescopically movable for compensating for changes in the vertical position of said shuttle assembly.

7. The apparatus of claim 1 wherein said shuttle assembly comprises a plurality of modular beam assemblies secured in generally axial alignment to define an elongated shuttle assembly.

8. The apparatus of claim 7 wherein each of said modular beam assemblies has a generally triangular tri-beam configuration having a first beam member adapted to be coupled to said counter-balance means and said first drive means, and second and third beam members provided in parallel relation below said first beam member along a generally horizontal plane, said second and third beam members adapted to support said carriage assembly for horizontal movement relative thereto.

9. The apparatus of claim 8 further comprising roller means for suspending said carriage assembly from said second and third beam members, said roller means rollingly engaging said second and third beam members such that said carriage assembly is horizontally movable along said second and third beam members.

10. The apparatus of claim 2 wherein said shuttle assembly and said carriage assembly are of a prefabricated modular construction capable of being combined in different multiples thereof to facilitate application to numerous transfer operations.

11. An apparatus for transferring parts between successive work stations in a multi-operation process, said apparatus comprising:

an elongated shuttle assembly;

linkage means coupled to said shuttle assembly for supporting said shuttle assembly along a horizontal axis from an overhead structure such that said shuttle assembly is supported above the successive work stations;

first drive means supported from said overhead structure for driving said linkage means for moving said shuttle assembly along a generally rectilinear vertical path relative to the successive work stations, said first drive means comprising a first electromechanical device having an output shaft coupled to said linkage means such that rotation of said first output shaft moves said linkage means so as to change rotational motion of said first output shaft into rectilinear vertical motion of said shuttle assembly;

a plurality of counter-balancing devices adapted to support said shuttle assembly from said overhead structure in said horizontal orientation;

a carriage assembly having a plurality of carriages and having means for mechanically interconnecting said plurality of carriages in a predetermined space relation generally corresponding to spacing between the successive work stations;

roller means for supporting said carriage assembly from a lower portion of said shuttle assembly, said roller means adapted to permit horizontal rectilinear movement of said carriage assembly relative to said shuttle assembly;

work supporting means supported on each of said plurality of carriages for picking up and depositing of the parts;

a rack member secured to said carriage assembly;

gear train means secured to said shuttle assembly and adapted for intermeshing engagement with said rack member;

second drive means supported from said overhead structure for driving said gear train means such that said rack member and said carriage assembly move relative to said shuttle assembly along said generally rectilinear horizontal path between the successive work stations; and controller means for selectively controlling actuation of said first and second drive means such that said rectilinear vertical path of said shuttle assembly and said rectilinear horizontal path of said carriage assembly can be continuously varied through a predetermined range of motion.

12. The apparatus of claim 11 wherein said overhead structure includes a modular superstructure having a multiplicity of vertically aligned, laterally offset pairs of columns supporting an overhead balcony thereon, said shuttle assembly supported between said columns of said overhead structure and being vertically movable between said balcony and said plurality of work stations.

13. The apparatus of claim 11 wherein said linkage means comprises:

a primary linkage assembly interconnecting said first output shaft of said first electro-mechanical device to said shuttle assembly;

a secondary linkage assembly spaced apart from said primary linkage assembly and interconnecting said primary linkage assembly and said shuttle assembly; and means for interconnecting said primary linkage assembly and said secondary linkage assembly to permit said first electro-mechanical device to synchronously drive said primary and secondary linkage assemblies upon rotation of said first output shaft.

14. The apparatus of claim 13 wherein rotation of said first output shaft in a first direction synchronously drives said primary and secondary linkage assemblies to generate upward vertical rectilinear movement of said shuttle assembly, and rotation of said first output shaft in a second direction drives said primary and secondary linkage assemblies to generate downward rectilinear vertical movement of said shuttle assembly.

15. The apparatus of claim 14 wherein said primary and secondary linkage assemblies are a scotch-yoke type linkage each comprising:
   a first pivot member coupled for rotation about a first pivot and having first and second leg members, said first leg member of said primary and secondary linkage assemblies being interconnected by a horizontal push-pull bar;
   a second pivot member secured to said second leg of said first pivot member and having first and second opposite ends, said first end slidably confined within a horizontally aligned yoke and said second end secured to said shuttle assembly;
   said first pivot member of said primary linkage assembly coupled to said first output shaft about said first pivot.

16. The apparatus of claim 11 wherein said second drive means includes a second electro-mechanical device mounted from said overhead structure and having an intermediate shaft interconnecting a second output shaft of said second electro-mechanical device to said gear train means, said intermediate shaft having position compensating means for compensating for changes in the vertical position of said shuttle assembly.

17. The apparatus of claim 16 wherein said shuttle assembly includes a plurality of modular beam assemblies secured in generally axial alignment, said modular beam assemblies defining a generally tri-beam configuration having a first beam member adapted to be coupled to said counter-balance devices and said linkage means, and second and third beam members provided in parallel relation below said first beam member, said second and third beam members adapted to receive said roller means for supporting said carriage assembly for horizontal movement relative thereto.

18. The apparatus claim 11 wherein said shuttle assembly and said carriage are of a prefabricated modular construction capable of being combined in different multiples thereof to facilitate application to numerous transfer operations.

19. The apparatus of claim 11 wherein said plurality of carriages corresponds to the number of successive work stations.

20. The apparatus of claim 11 wherein said rectilinear vertical path has a range of motion of about 48 inches and said rectilinear horizontal path has a range of motion of about 20 feet.

21. A method for transferring parts between successive work stations in a multi-station process, comprising the steps of:

suspending an elongated shuttle assembly in a horizontal orientation from a overhead structure above the successive work stations;

connecting a plurality of counter-balancing devices between said shuttle assembly and said overhead structure for supporting said shuttle assembly from said overhead structure;

providing first electro-mechanical drive means for moving said shuttle assembly along a generally rectilinear vertical path relative to the successive work stations, said first electro-mechanical drive means being mounted on said overhead structure;

interconnecting linkage means between said shuttle assembly and said first electro-mechanical drive means;

actuating said first electro-mechanical drive means such that said linkage means changes rotational motion of a drive shaft associated with said first electro-mechanical drive means into translational vertical movement of said shuttle assembly;

supporting a carriage assembly having a plurality of distinct carriages from a lower portion of said shuttle assembly, said carriage assembly adapted to be horizontally movable relative to said shuttle assembly;

providing second electro-mechanical drive means for moving said carriage assembly relative to said shuttle assembly along a generally rectilinear horizontal path to transfer parts from successive work stations, said second electro-mechanical drive means being supported from said overhead structure;

actuating said second electro-mechanical drive means for causing said rectilinear horizontal movement of said carriage assembly;

controlling actuation of said first electro-mechanical drive means for permitting selective adjustment of said rectilinear vertical movement of said shuttle assembly within a predetermined range of motion; and controlling actuation of said second electro-mechanical drive means for permitting selective adjustment of said rectilinear horizontal movement of said carriage assembly within a second predetermined range of motion.

22. A method for transferring parts between successive work stations in a multi-operation process, comprising the steps of:

interconnecting a plurality of counter-balance devices between a shuttle assembly and an overhead support structure for suspending said elongated shuttle assembly in a horizontal plane above the successive work stations;

providing a first drive mechanism having a first rotatable output shaft;

interconnecting pivotable linkage means between said first output shaft and said shuttle assembly;

supporting a carriage assembly from a lower portion of said shuttle assembly, said carriage assembly having a plurality of individual transfer carriages corresponding in number and spacing to that of the successive work stations;

attaching work-piece supporting means from each of said transfer carriages for engaging the parts;

providing a second drive mechanism having a second rotation output shaft;

interconnecting said second output shaft to said carriage assembly;

actuating said first drive mechanism for changing rotational motion of said first output shaft into translational vertical motion of said shuttle assembly, said actuation defining a rectilinear vertical path for said shuttle assembly for picking up and depositing parts from the successive work stations; and actuating said second drive mechanism for moving said carriage assembly along a rectilinear horizontal path for transferring parts supported from said work-piece supporting means between the successive work stations;

controlling actuation of said first drive mechanism for permitting selective continuously variable adjustment of said rectilinear vertical movement of said shuttle assembly within a predetermined range of motion for picking up and depositing parts from the work stations; and controlling actuation of said second drive mechanism for permitting selective continuously variable adjustment of said rectilinear horizontal movement of said carriage assembly within a second predetermined range of motion for transferring parts between the successive work stations.

23. The method of claim 22 wherein said step of interconnecting said pivotable linkage means further comprises;

coupling a primary linkage assembly between said first output shaft and said shuttle assembly;

coupling a secondary linkage assembly spaced apart from said primary linkage assembly to said shuttle assembly; and interconnecting said primary and secondary linkage assemblies to permit said first drive mechanism to synchronously drive said primary and secondary linkage assemblies upon rotation of said first output shaft.

24. The method of claim 22 wherein actuation of said first drive mechanism to generate rotation of said first output shaft in a first direction generates upward vertical movement of said shuttle assembly and rotation of said first output shaft in a second direction generates downward vertical movement of said shuttle assembly.

25. The method of claim 22 wherein said step of supporting said carriage assembly from said shuttle assembly includes providing roller clusters for supporting said carriage assembly from a pair of horizontal beams associated with said lower portion of said shuttle assembly and which are adapted to permit horizontal rectilinear movement of said carriage assembly thereon.

26. The method of claim 25 wherein said step of interconnecting said second output shaft to said carriage assembly includes:

securing an elongated rack member to said carriage assembly;

intermeshing a gear device associated with said shuttle assembly to said rack member;

coupling said gear device to said second output shaft for driving said gear device so as to generate horizontal movement of said rack member and said carriage assembly.

27. The method of claim 26 wherein said coupling step includes providing an intermediate shaft having universal joints at opposite ends thereof which are respectively interconnected to said second output shaft and said gear device, said intermediate shaft being vertically movable with said shuttle assembly.

* * * * *